(No Model.)
F. M. SPARROW.
ELECTRIC HEAT REGULATING SYSTEM.
No. 433,375. Patented July 29, 1890.
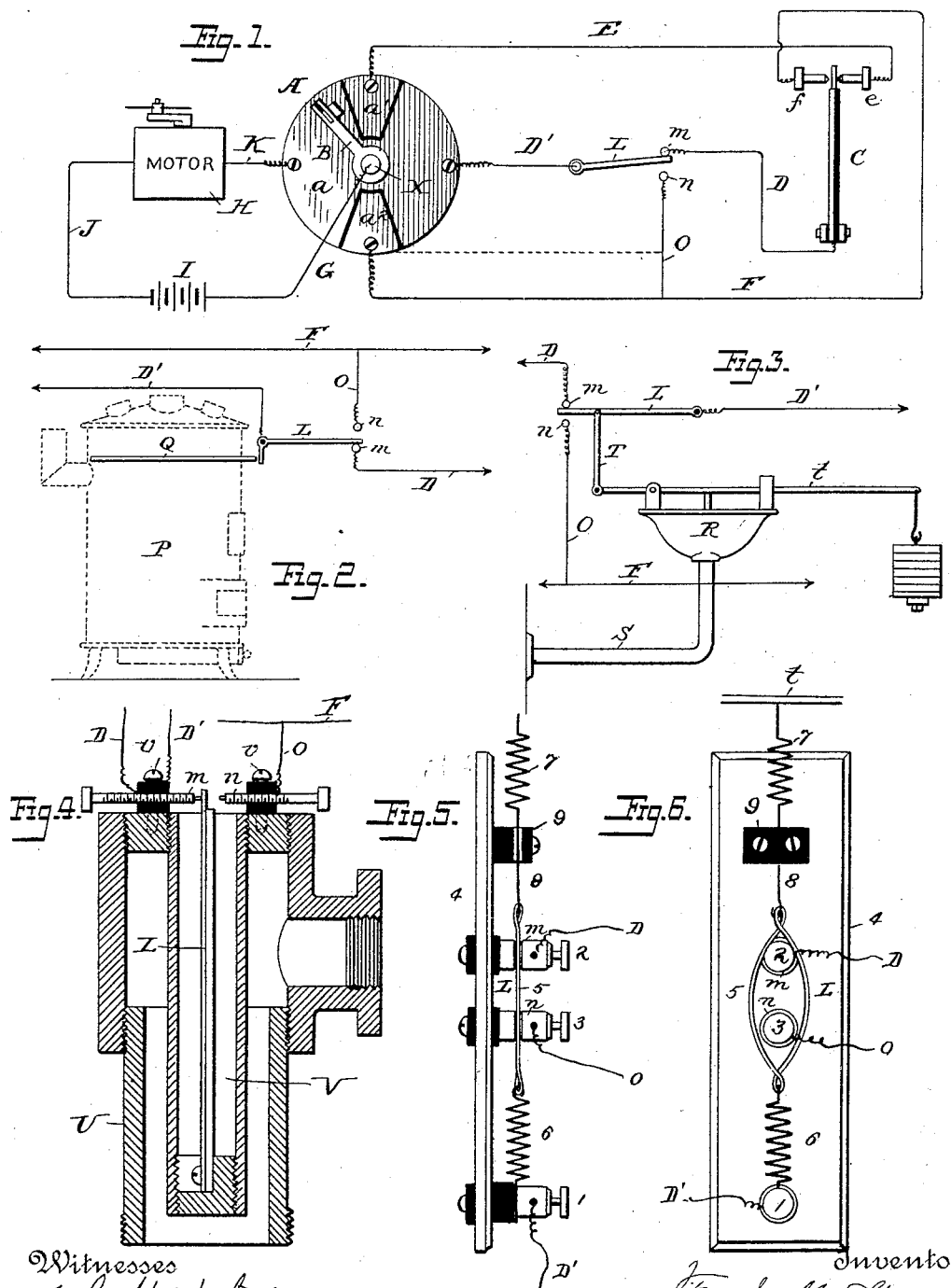
Witnesses
Inventor
Frank M. Sparrow.
By his Attorneys
Foster and Freeman.

UNITED STATES PATENT OFFICE.

FRANK MILLER SPARROW, OF MATTAPOISETT, MASSACHUSETTS.

ELECTRIC HEAT-REGULATING SYSTEM.

SPECIFICATION forming part of Letters Patent No. 433,375, dated July 29, 1890.

Application filed September 26, 1889. Serial No. 325,135. (No model.)

*To all whom it may concern:*

Be it known that I, FRANK MILLER SPARROW, a citizen of the United States, residing at Mattapoisett, in the county of Plymouth and State of Massachusetts, have invented certain new and useful Improvements in Automatic Electric Heat-Regulating Systems, of which the following is a specification.

In the use of automatic electric heat-governing devices wherein the fire is controlled through the movements of a thermostat situated in the apartment being heated, it oftentimes occurs that the fire becomes much too intense before the temperature of the apartment is sufficiently raised to cause the thermostat to operate to check the fire, and this is more especially true in steam and hot-water heaters than in hot-air heaters, in which latter systems the temperature of the apartment more quickly follows that of the fire. To illustrate, let it be supposed that the apartment being heated is exposed to the winter's sun. Upon a bright day but little, if any, heat beyond that received from solar influence will be required and the thermostat will cause the drafts to be closed or otherwise check the fire, which becomes dull, and if a steam system be employed little or no pressure will be on. It will be understood that this may, and often does, occur when the external air is at a low temperature, and that it is the direct heat-rays only which cause a pleasant temperature to be maintained in the apartment. It therefore follows that as soon as the rays of the sun cease to enter the apartment the temperature therein rapidly falls, which of course causes the fire to be started. The fire being low, however, and the water in the boiler below the boiling-point, it takes some time for steam to be raised, during which time the temperature in the apartment continues to fall. When, however, the fire is sufficiently started to generate steam, the pressure thereof will quickly rise, much more quickly than will the temperature of the compartment, so that before the theremostat makes contact to check the fire the steam-pressure may have been (and often is) raised to fifteen or twenty pounds, whereas it should not exceed five pounds. In hot-water systems substantially the same result occurs—that is, the fire becomes so intense as often to cause the water in the boiler to boil—whereas it should not rise above 200° Fahrenheit before the apartment is heated and the fire automatically checked. With hot-air systems this result occurs likewise, but to a more limited extent.

It is the object of my invention to overcome this objectionable feature incident to automatic heat-regulating devices; and to that end I interpose in the circuit between the thermostat and the motor, which controls the drafts of the furnace, a switch device, operated by the steam-pressure, or water or hot-air temperature, which directly causes the motor to operate to check the fire when it becomes sufficiently intense, irrespective of the position of the thermostat. This supplemental switch device is set so as to operate only when an excessive temperature at the furnace or boiler is reached, and hence under ordinary circumstances is not brought into operation, but leaves the thermostat free to perform its functions in the ordinary manner.

This invention may be applied to any of the automatic electric heat-regulating systems, and I have illustrated it as used in connection with the system patented to me December 11, 1888, by United States Patent No. 394,220.

Figure 1 is a diagrammatic view illustrating the invention. Fig. 2 shows the invention applied to a hot-air furnace. Fig. 3 is a detached view showing a means of connection with a steam-boiler. Fig. 4 shows a means for applying the invention to a hot-water system. Figs. 5 and 6 are respectively a side and a front view of the form of supplemental switch which I prefer to use in connection with a steam-boiler.

As the circuits, the motor, and the various connections of my system are shown and described in detail in my aforesaid patent, I will not herein give an extended description of those parts which are common to the two inventions.

Referring to the drawings, particularly to Fig. 1, C designates the thermostat situated in the apartment, the temperature of which is to be governed, and $e$ and $f$ are the contacts, between which the free end of the thermostat moves. These contacts $e$ and $f$ are connected, respectively, by the conductors E and F with the insulated sections $a'$ and $a^2$ of the stationary disk-switch A, while the stationary portion of the thermostat is connected by a conductor D D' with the main portion $a$ of the disk-switch.

The motor H is connected by a wire K with the main portion $a$ of the disk-switch and by a wire J with the battery I, which is also connected by the wire G with the shaft X, driven through any suitable connection by the motor, and carrying the brush B, which moves past the insulated sections $a$, $a'$, and $a^2$ of the disk-switch. The position of the shaft X and the brush carried thereby governs the position of the dampers or other fire-controlling devices.

Instead of making the conductor D D' integral or continuous, as in my previous device, I interpose in some part thereof, preferably near the furnace or boiler, a movable portion or switch L, adapted to move between two contacts $m$ and $n$, the former being in the conductor D and the latter connected by the wire O with the conductor F, which is the one which, when the electric circuit is completed through it, causes the motor to operate to check the fire. It will be understood that the wire O might be continued directly from the contact $n$ to the plate $a^2$, as shown in dotted lines, Fig. 1, instead of uniting with the wire F.

The switch L is normally in engagement with the contact $m$, and thereby maintains the connection between the thermostat and the motor through the portion $a$ of the disk-switch and the other connections, so that under ordinary circumstances the device operates as though the conductor D D' were not broken, and the fire is controlled entirely by the thermostat. Under extraordinary circumstances, however, as when the fire becomes too intense, the switch L is operated, cutting out the thermostat and completing the circuit through the contact $n$, the conductors O, F, and $a^2$, thence through the brush B and wire G to the battery, and thence through the motor to the wire K, the conducting-plate $a$, and the conductor D' back to the switch L. This completing of the circuit causes the motor to operate to check the fire, the brush in the meantime passing onto the insulated plate $a'$, this operation being performed, it is supposed, while the thermostat is in engagement with the contact $e$, as shown, which normally causes the fire to be increased. The parts remain in the last-described position, with the thermostat cut out, until the extraordinary conditions which caused the switch L to be operated have passed, when it resumes to its normal position in engagement with the contact $m$, thereby restoring the thermostat into the circuit. If during the time the thermostat has been cut out the temperature of the apartment has not so far risen as to cause the free end thereof to leave the contact $e$, the motor will be immediately operated to again start up the fire; but if the thermostat has left the contact $e$, the position of the parts remain unchanged until the apartment temperature falls below the desired degree.

The switch L may be moved by various means, which will be varied to suit the heating system to which the device is applied.

In Fig. 2 I have shown the invention applied to a hot-air heater P, somewhere within the casing of which is arranged a rod Q, formed of a metal having a high coefficient of expansion. Opposite the end of this rod, so as to be acted thereon as it expands, is the switch L, which in this instance is in the form of a bell-crank lever.

In Fig. 3 is shown a steam-boiler connection. S represents a steam-pipe leading into a chamber R, covered by a flexible diaphragm. This diaphragm is connected with the switch L by the link and lever T $t$, so that an excessive pressure of steam will move the diaphragm and cause the switch to be shifted, so as to cut out the thermostat and cause the motor to operate to check the fire.

Fig. 4 represents a means of applying the invention to a hot-water system. In the said figure, U represents the hot-water pipe, in which is located, near to the point where the hot water leaves the boiler, a shell V, in which is located the swith L, which in this instance is in the form of a thermostatic bar. The bar normally rests in contact with the contact-point $m$ in the conductor D, which in this case is shown as including the thermostatic bar, the switch L, the metallic casing V, and the pin or screw $v$.

In Figs. 5 and 6 I have shown the supplemental switch device, which I prefer to employ in connection with a steam-heating system. It consists of a metallic plate 4, from which project three insulated binding-posts 1, 2, and 3, the latter two constituting the contacts $m$ and $n$ and having connected thereto, respectively, the wires D and O. The wire D' connects with the binding-posts 1. The switch L consists of a looped or oval-shaped wire 5, encircling the binding-posts 2 and 3, but so shaped that it is in engagement with but one thereof at a time. The loop 5 is supported at its opposite ends by coiled springs 6 and 7, the former connecting it with the post 1 and the latter with the link or rod T, connected with the steam-diaphragm, the relative tension of the springs being such that the looped wire is normally drawn into contact with the post 2. When, however, the steam-pressure rises above a predetermined point, the link or rod T is moved and draws upon the spring 7, which pulls the loop 5 from engagement with the post 2 into contact with the post 3, thereby cutting out the thermostat and causing the fire to be checked in the manner hereinbefore described. The straight stem portion 8 of the spring 7 passes through an insulated guide 9, so as to govern the position of the loop 5 relative to the posts 2 and 3.

Without limiting myself to the precise construction and arrangement of parts shown, I claim—

1. In an automatic electric heat-regulating system, the combination, with the heater, the thermostat situated in the apartment to be heated, and the motor controlled by the thermostat for regulating the heater, of a supplemental switch controlled by the heater and arranged to regulate the motor independent of the thermostat, substantially as set forth.

2. In an automatic electric heat-regulating system, the combination, with the heater, the thermostat situated in the apartment to be heated, and the motor in circuit with the thermostat and normally controlled thereby for regulating the heater, of a supplemental switch situated in the circuit between the thermostat and the motor, controlled by the heater and arranged to cut out the thermostat and control the motor independently of the thermostat, substantially as set forth.

3. In an automatic electric heat-regulating system, the combination, with the heater, the thermostat, the two partial circuits between the terminal contacts of which the thermostat moves, the motor normally controlled by the thermostat for regulating the heater, and the conductor between the motor and the thermostat, of a supplemental switch situated in the said conductor and arranged normally to complete the same, and a conductor terminating adjacent to the said switch connecting with the motor, and means for operating the said switch to bring it into electric contact with the last said conductor, whereby the motor is caused to operate independently of the position of the thermostat under predetermined conditions, substantially as set forth.

4. In an automatic heat-regulating system, the combination, with the heater, the motor controlling the heater, the thermostat, and a switch A, connected with the thermostat and with the motor, of a switch L, situated in the conductor between the fixed end of thermostat and the switch A, the contacts $m$ and $n$ between which the switch moves, the conductor between the contact $n$ and the switch A, and means operated by the heater for moving the switch L under predetermined conditions of the heater, substantially as set forth.

5. The combination, with an automatic electric heat-regulating system, of a supplemental switch connected to be operated by a steam-pressed diaphragm, of the heater for controlling the circuit in which the motor is situated, substantially as set forth.

6. The combination, with an automatic electric heat-regulating system including an electric motor and a thermostat, of a supplemental switch connected to be operated by a steam-pressed diaphragm of the heater for controlling the circuit in which the motor is situated, and consisting of a loop of wire or equivalent material supported by springs and surrounding two binding-posts, with one of which, connected with the thermostat, it is normally held in contact by the springs, and with the other of which, connected with the motor, it is brought into contact by the movement of the diaphragm, substantially as set forth.

In testimony whereof I have signed my name to this specification in the presence of two subscribing witnesses.

FRANK MILLER SPARROW.

Witnesses:
 SARAH H. CROSBY,
 ELLIS MENDELL.